United States Patent
Ishihama

(10) Patent No.: US 10,365,106 B2
(45) Date of Patent: Jul. 30, 2019

(54) ELECTRONIC APPARATUS, ANGULAR VELOCITY ACQUISITION METHOD AND STORAGE MEDIUM FOR THE SAME

(71) Applicant: CASIO COMPUTER CO., LTD., Tokyo (JP)

(72) Inventor: Takanori Ishihama, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 290 days.

(21) Appl. No.: 15/377,355

(22) Filed: Dec. 13, 2016

(65) Prior Publication Data
US 2017/0176187 A1 Jun. 22, 2017

(30) Foreign Application Priority Data
Dec. 21, 2015 (JP) ................... 2015-248319

(51) Int. Cl.
| | |
|---|---|
| *G01C 19/00* | (2013.01) |
| *G01C 19/5776* | (2012.01) |
| *G01C 21/08* | (2006.01) |
| *G01C 17/38* | (2006.01) |
| *G01C 21/16* | (2006.01) |
| *G01C 25/00* | (2006.01) |

(52) U.S. Cl.
CPC ......... *G01C 19/5776* (2013.01); *G01C 17/38* (2013.01); *G01C 21/08* (2013.01); *G01C 21/165* (2013.01); *G01C 25/00* (2013.01)

(58) Field of Classification Search
CPC .... G01C 17/38; G01C 21/08; G01C 19/5776; G01C 21/165; G01C 25/00
USPC .............................. 73/1.41, 514.16
See application file for complete search history.

(56) References Cited

U.S. PATENT DOCUMENTS

| | | | | |
|---|---|---|---|---|
| 2013/0063647 A1* | 3/2013 | Nishikawa | ............. | H04N 5/225 348/333.02 |
| 2014/0195185 A1* | 7/2014 | Anderson | ................. | G01P 3/44 702/88 |
| 2014/0202229 A1* | 7/2014 | Stanley | ................ | G01C 25/005 73/1.79 |
| 2015/0233714 A1* | 8/2015 | Kim | ....................... | G01C 17/38 33/356 |

FOREIGN PATENT DOCUMENTS

WO  2007/099599 A1  9/2007

* cited by examiner

*Primary Examiner* — Max H Noori
(74) *Attorney, Agent, or Firm* — Scully Scott Murphy & Presser

(57) ABSTRACT

An electronic apparatus includes a magnetic sensor which acquires a status of a magnetic field around the electronic apparatus, an angular velocity sensor, and a processor. The processor controls whether the detection of an angular velocity of a spatial movement of the electronic apparatus is performed by the angular velocity sensor or a magnetic gyro sensor composed of the magnetic sensor, based on the status of the magnetic field acquired by the magnetic sensor.

15 Claims, 7 Drawing Sheets

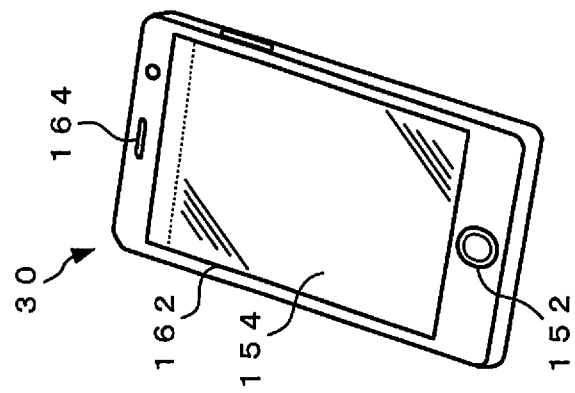
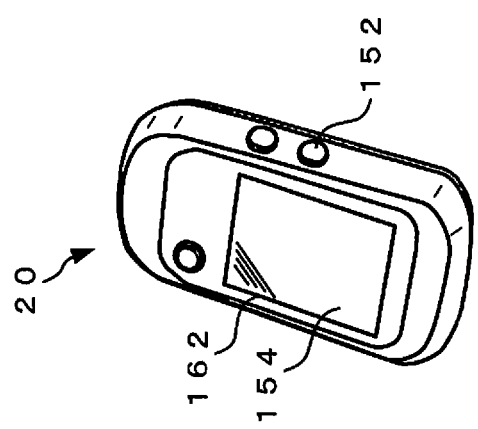
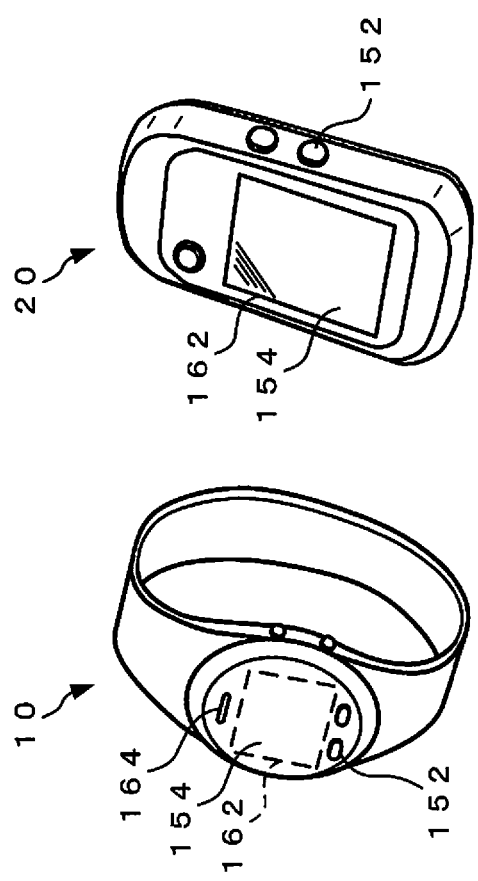

ELECTRONIC APPARATUS, ANGULAR VELOCITY ACQUISITION METHOD AND STORAGE MEDIUM FOR THE SAME

CROSS-REFERENCE TO RELATED APPLICATION

This application is based upon and claims the benefit of priority from the prior Japanese Patent Application No. 2015-248319, filed Dec. 21, 2015, the entire contents of which are incorporated herein by reference.

BACKGROUND OF THE INVENTION

1. Field of the Invention

The present invention relates to an electronic apparatus having an angular velocity detection function, an angular velocity acquisition method for the electronic apparatus, and a storage medium having stored thereon an angular velocity acquisition program that is applied in the angular velocity acquisition method.

2. Description of the Related Art

In recent years, various electronic apparatuses such as cellular phones, smartphones (high- functionality cellular phone), navigation terminals, smart devices that are worn on human bodies and the like are widely available.

In general, such electronic apparatuses are equipped with various types of motion sensors including an angular velocity sensor (or gyro sensor) for detecting change in the angular velocity of an object.

This angular velocity sensor has been widely used in the fields of attitude control for aircrafts and robots, image stabilization for imaging apparatuses, game controllers, etc. In recent years, it is mounted in smartphones and smart devices which are now significantly prevalent, and used to acquire information regarding a user's exercise status, movement trajectory, and the like.

As such, the angular velocity sensor is a useful sensor that is capable of directly detecting change in the angular velocity of an electronic apparatus having the sensor or the angular velocity of the body motion of a user wearing or carrying the electronic apparatus. However, it is known that its power consumption is generally large as compared to those of other motion sensors such as an acceleration sensor and a geomagnetic sensor (or magnetic sensor). Therefore, when an angular velocity sensor is mounted in a battery-operated apparatus such as a portable electronic apparatus or a wearable apparatus, its driving time may become short.

Accordingly, a method has been proposed in which angular velocity is calculated and estimated based on the output of a geomagnetic sensor or the outputs of a geomagnetic sensor and an acceleration sensor, whereby a function equivalent to that of an angular velocity sensor is achieved, as described in International Publication No. 2007-099599.

This method for calculating angular velocity is a method using what is called a magnetic gyro sensor. In this method, in short, angular velocity is calculated based on a temporal change in a geomagnetism vector detected by a geomagnetic sensor mounted in an electronic apparatus.

In general, the power consumption of a geomagnetic sensor is small as compared to that of an angular velocity sensor. Therefore, the above-described method using a magnetic gyro sensor has an effect contributing to the improvement of the driving time of an electronic apparatus by reducing its power consumption.

However, geomagnetic sensors are easily affected by magnetic fields around electronic apparatuses having these sensors or magnetism from components arranged around them in the electronic apparatuses. Accordingly, there is a problem in that, when a geomagnetic field that is supposed to be detected by a geomagnetic sensor is affected by these disturbance noises, accurate angular velocities are difficult to be calculated.

SUMMARY OF THE INVENTION

The present invention has the advantage of providing an electronic apparatus having an angular velocity detection function that can detect an adequate angular velocity by reducing the effect of a surrounding magnetic field while reducing power consumption, an angular velocity acquisition method of the electronic apparatus, and a storage medium having an angular velocity acquisition program of the electronic apparatus stored thereon.

In accordance with one aspect of the present invention, there is provided an electronic apparatus comprising: a magnetic sensor which acquires a status of a magnetic field around the electronic apparatus; an angular velocity sensor; and a processor, wherein the processor controls whether detection of an angular velocity of a spatial movement of the electronic apparatus is performed by the angular velocity sensor or a magnetic gyro sensor composed of the magnetic sensor, based on the status of the magnetic field acquired by the magnetic sensor.

In accordance with another aspect of the present invention, there is provided an angular velocity acquisition method for an electronic apparatus, wherein the electronic apparatus comprises a magnetic sensor which acquires a status of a magnetic field around the electronic apparatus, and an angular velocity sensor, and wherein the angular velocity acquisition method comprises a control step of controlling whether detection of an angular velocity of a spatial movement of the electronic apparatus is performed by the angular velocity sensor or a magnetic gyro sensor composed of the magnetic sensor, based on the status of the magnetic field acquired by the magnetic sensor.

In accordance with another aspect of the present invention, there is provided a non-transitory computer-readable storage medium having stored thereon an angular velocity acquisition program that is executable by a computer in an electronic apparatus, wherein the electronic apparatus comprises a magnetic sensor which acquires a status of a magnetic field around the electronic apparatus, and an angular velocity sensor, and wherein the angular velocity acquisition program is executable by the computer to actualize functions comprising control processing for controlling whether detection of an angular velocity of a spatial movement of the electronic apparatus is performed by the angular velocity sensor or a magnetic gyro sensor composed of the magnetic sensor, based on the status of the magnetic field acquired by the magnetic sensor.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1A, FIG. 1B and FIG. 1C are schematic structural diagrams showing a plurality of examples in which the present invention has been applied in an electronic apparatus;

DETAILED DESCRIPTION OF THE PREFERRED EMBODIMENTS

An electronic apparatus according to the present invention and an angular velocity acquisition method therefor will hereinafter be described in detail with reference to the drawings.

<First Embodiment>

(Electronic Apparatus)

FIG. 1A, FIG. 1B and FIG. 1C are schematic structural diagrams showing a plurality of examples in which the present invention has been applied in an electronic apparatus.

Figure 2:
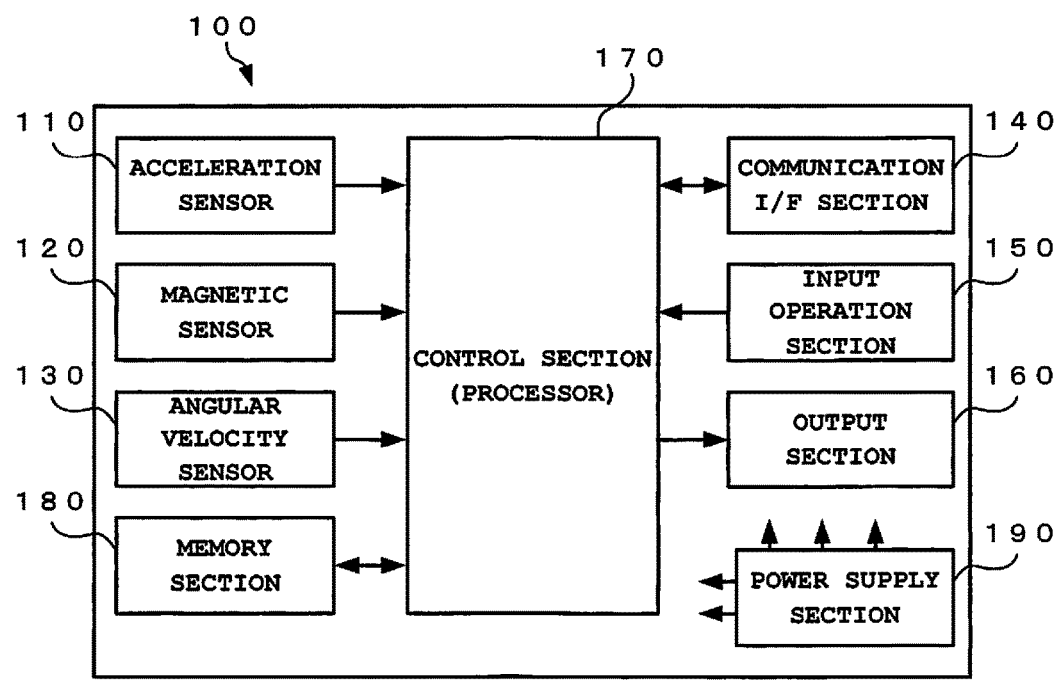
FIG. 2 is a functional block diagram showing a first embodiment of an electronic apparatus according to the present invention.

FIG. 2 is a functional block diagram showing a first embodiment of an electronic apparatus according to the present invention.

The present invention is applied in an electronic apparatus which has at least an angular velocity detection function and provides a user with various services using information regarding the user's exercise status, movement trajectory, and the like.

More specifically, the present invention can be applied in a portable or wearable electronic apparatus, such as a smartwatch having a wristwatch-type or wristband-type outer appearance as shown in FIG. 1A, an outdoor device 20 including a GPS Roger and a navigation terminal as shown in FIG. 1B, and a tablet terminal or a smartphone 30 shown in FIG. 1C.

Note that the present invention is not limited to the electronic apparatuses shown in the drawings, and can be applied in a smart device or a sensor device that is worn on an arm, a leg, or the head of a human body, the neck or the chest on the trunk, or the waist, and detects and stores angular velocities of a corresponding body part.

In the descriptions below, these electronic apparatuses are collectively referred to as "electronic apparatus 100" for convenience of explanation.

The electronic apparatus 100 according to the first embodiment of the present invention includes, for example, an acceleration sensor 110, a magnetic sensor 120, an angular velocity sensor (gyro sensor) 130, a communication interface section (hereinafter briefly referred to as "communication I/F section") 140, an input operation section 150, an output section 160, a control section (processor) 170, a memory section 180, and a power supply section 190, as shown in FIG. 2.

The acceleration sensor 110 measures the rate of change (acceleration) in the movement speed of the electronic apparatus 100 which occurs in response to the movement of the user's body.

This acceleration sensor 110, which includes a triaxial acceleration sensor, detects acceleration components (acceleration signals) in three axial directions orthogonal to one another, and outputs them as acceleration data.

The magnetic sensor 120, which includes a triaxial magnetic sensor, detects the earth's magnetic field as geomagnetic components (magnetic signals) in three axial directions orthogonal to one another, and outputs it as magnetic data (or three-dimensional direction data).

The angular velocity sensor 130 measures change (angular velocity) in the movement direction of the electronic apparatus 100 which occurs in response to the movement of the user's body.

This angular velocity sensor 130, which includes a triaxial angular velocity sensor, detects angular velocity components (angular velocity signals) in the rotation directions of rotational movements around three axes orthogonal to one another, and outputs them as angular velocity data. Note that the three axial directions of the acceleration sensor 110 and the three axial directions of the angular velocity sensor 130 are set to be the same directions, respectively.

Pieces of sensor data (acceleration data, magnetic data, angular velocity data) acquired by the acceleration sensor 110, the magnetic sensor 120, and the angular velocity sensor 130 are respectively associated with time data and stored in a predetermined storage area of the memory section 180.

The acceleration sensor 110 and the angular velocity sensor 130 function as a motion sensor, and pieces of sensor data (acceleration data and magnetic data) detected by these sensors are used when the control section 170 described later detects the user's body movement and exercise status, a specific directional force applied on the electronic apparatus 100, and the like.

Magnetic data detected by the magnetic sensor 120 is used when azimuth directions relative to the electronic apparatus 100 are calculated in the control section 170.

In this embodiment, the acceleration sensor 110 and the magnetic sensor 120 function as a magnetic gyro sensor, and pieces of sensor data (acceleration data and magnetic data) detected by these sensors are used when angular velocity is calculated in the control section 170.

The communication I/F section 140 transmits and receives various types of data to and from an information and communication apparatus (a personal computer, a smartphone, etc.) outside the electronic apparatus 100 or a network. Here, in the communication via the communication I/F section 140, a predetermined wired or wireless communication method is used, which includes a transfer method where data is transferred via a storage medium such as a memory card.

The input operation section 150 includes, for example, an operation switch 152 and a touch panel 154 provided on the housing of the electronic apparatus 100 (the smartwatch 10, the outdoor device 20, the smartphone 30) shown in FIG. 1.

This input operation section 150 is used for various types of input operations, such as an operation related to the operation power supply of the electronic apparatus 100 or application software, an operation of setting an item for which a notification is given by the output section 160 (a display section, a sound section, etc.) described below.

The output section 160 has a display section 162, a sound section 164, a vibration section (not shown in the drawing), and the like provided in the housing of the electronic apparatus 100.

This output section 160 visually, aurally, or tactually provides the user with or notifies the user of information regarding the user's exercise status, movement trajectory, or the like and information regarding the execution status of the later-described angular velocity calculation processing which are generated based on sensor data acquired by at least the acceleration sensor 110, the magnetic sensor 120, and the angular velocity sensor 130 described above.

Note that, in a case where the electronic apparatus 100 is a smart device or a sensor device that is worn on the body and used only for detecting and collecting sensor data of a corresponding body part, a configuration excluding the output section 160 may be adopted.

The control section (processor) 170 is an arithmetic processing unit (computer) having a clocking function, such as a CPU (Central Processing Unit) or a MPU (Micro Processing Unit), and controls operations such as sensing operations by the acceleration sensor 110, the magnetic sensor 120, and the angular velocity sensor 130 and an operation of generating information regarding the user's exercise status, movement trajectory, or the like based on acquired sensor data, by executing a predetermined control program and a predetermined algorithm program.

In this embodiment, the control section 170 controls the operations of the angular velocity sensor 130 and the magnetic gyro sensor constituted by the magnetic sensor 120 or constituted including the acceleration sensor 110 and the magnetic sensor 120, and thereby controls a processing operation for acquiring adequate angular velocity data. Note that a method for acquiring angular velocity data in the present embodiment is described later in detail.

The memory section 180 associates sensor data acquired by the acceleration sensor 110, the magnetic sensor 120, and the angular velocity sensor 130, and various types of data generated (calculated) in the control section 170 with time data, and stores them in the predetermined storage area.

This memory section 180 stores control programs and algorithm programs that are executed in the control section 170. Note that these programs may be incorporated in advance in the control section 170.

In addition, the memory section 180 may be partially or entirely in a form of a removable storage medium such as a memory card, and may be structured to be removable from the electronic apparatus 100.

The power supply section 190 supplies driving power to each section of the electronic apparatus 100. As the power supply section 190, a primary battery such as a commercially-available coin-shaped battery, a secondary battery such as a lithium-ion battery, and a power supply by energy harvest technology for generating electricity by energy such as vibrations, light, heat, and electro-magnetic waves can be used singly or in combination.

(Angular Velocity Acquisition Method for Electronic Apparatus)

Next, an angular velocity acquisition method for the electronic apparatus according to the first embodiment is described with reference to the drawings.

Note that the below-described angular velocity acquisition method (flowchart shown in FIG. 3) for the electronic apparatus 100 is achieved by the control section 170 performing processing in accordance with a predetermined control program and a predetermined algorithm program.

Figure 3:
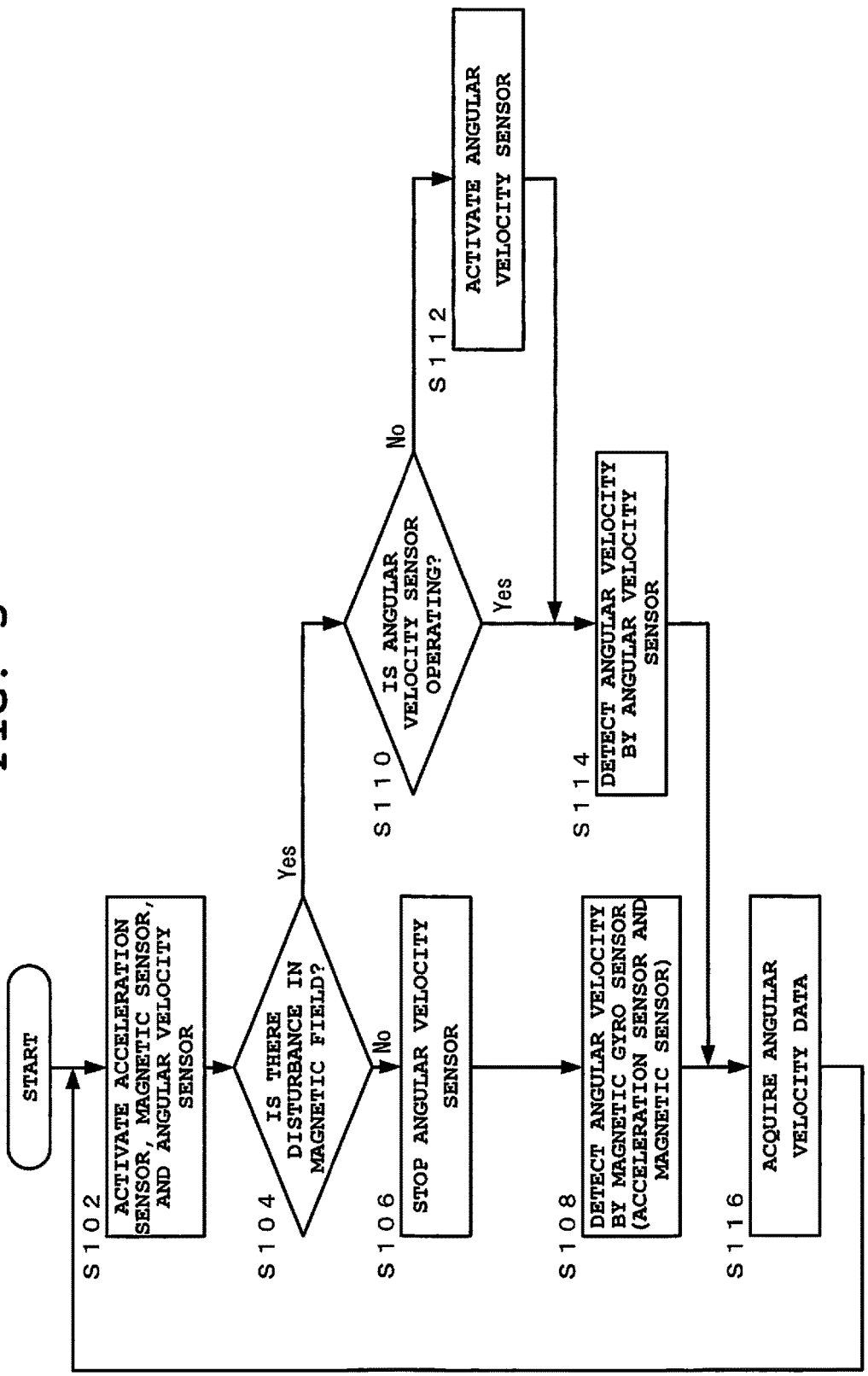
FIG. 3 is a first flowchart showing an example of an angular velocity acquisition method for the electronic apparatus according to the first embodiment.
Figure 4:
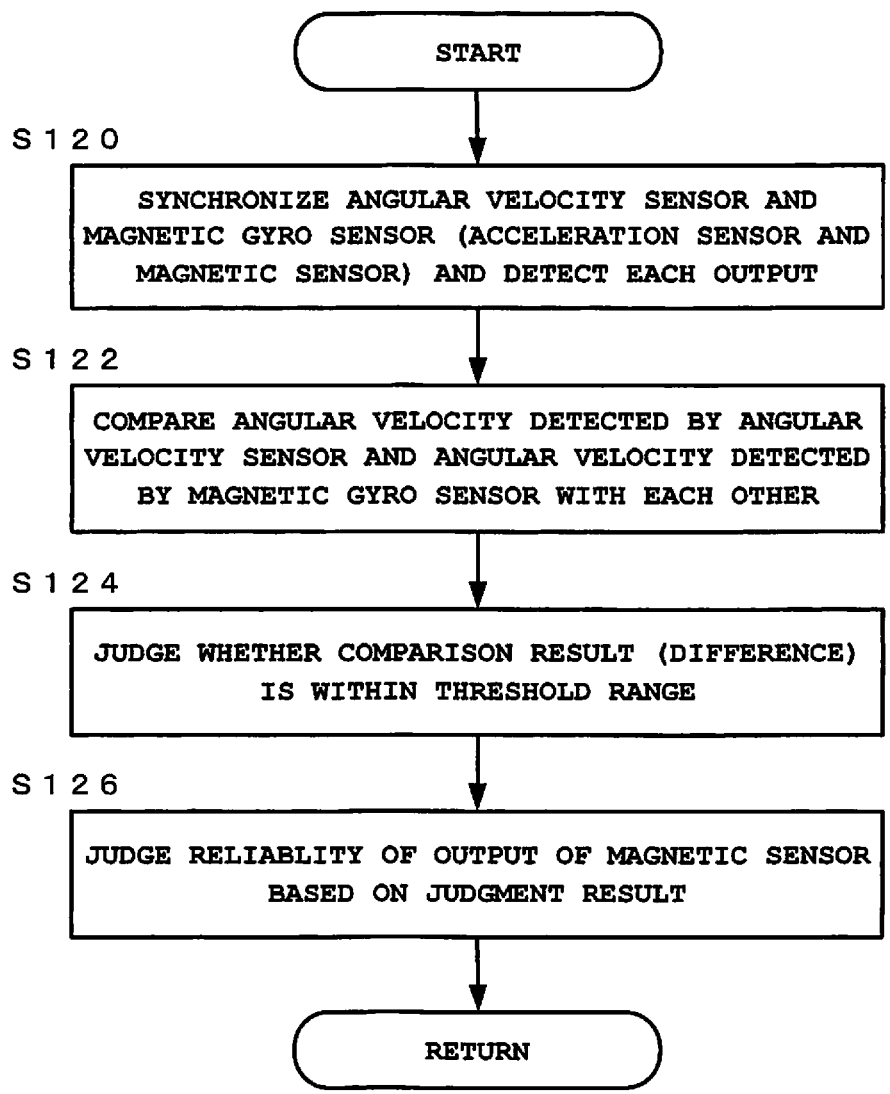
FIG. 4 is a second flowchart showing the example of the angular velocity acquisition method for the electronic apparatus according to the first embodiment.

FIG. 3 and FIG. 4 are flowcharts showing an example of the angular velocity acquisition method for the electronic apparatus according to the present embodiment.

Figure 5:
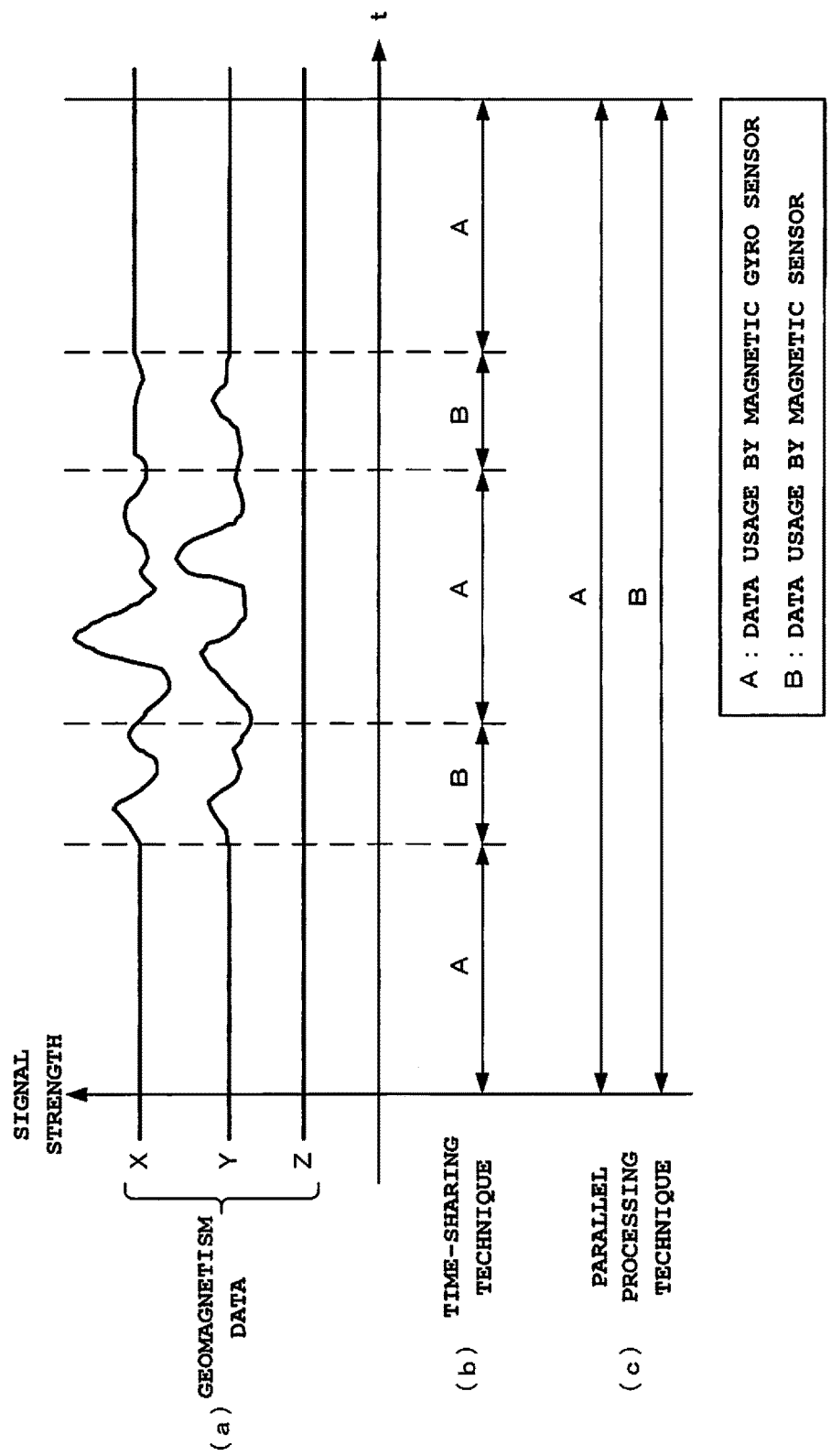
FIG. 5 is a timing chart showing the usage status of magnetic data in the first embodiment.

FIG. 5 is a timing chart showing the usage status of magnetic data in the present embodiment.

In the angular velocity acquisition method for the electronic apparatus 100 according to the present embodiment, first, when the electronic apparatus 100 is turned on, the acceleration sensor 110, the magnetic sensor 120, and the angular velocity sensor 130 are activated, and start sensing operations (Step S102), as shown in the flowchart in FIG. 3.

Subsequently, the control section 170 judges whether or not there is any disturbance or magnetic anomaly in a magnetic field around the magnetic sensor 120 at this point (Step S104).

More specifically, the control section 170 first synchronizes the acceleration sensor 110 and the magnetic sensor 120 constituting a magnetic gyro sensor with the angular velocity sensor 130 so as to operate them, and detects angular velocity from each output therefrom (Step S120), as shown in the flowchart in FIG. 4.

Subsequently, the control section 170 compares the angular velocities detected respectively by the magnetic gyro sensor and the angular velocity sensor 130 with each other (Step S122).

Then, the control section 170 judges whether a difference between them, which is a result of the comparison, is within a threshold range set in advance (Step S124). Here, a difference of an output from the magnetic gyro sensor with respect to (with reference to) an output from the angular velocity sensor is determined as the comparison result, based on an assumption that the output from the angular velocity sensor is accurate.

Note that the output of the angular velocity sensor 130 can be maintained to be accurate by well-known calibration processing being performed periodically or constantly.

Then, when judged at Step S124 that the comparison result is within the threshold range, the control section 170 judges that there is no magnetic field disturbance or magnetic anomaly and the magnetic sensor 120 is not being affected by any disturbance noise. That is, in this case, the control section 170 judges that the output of the magnetic sensor 120 is reliable (Step S126).

Conversely, when judged that the comparison result is not within the threshold range, the control section 170 judges that there is a magnetic field disturbance or magnetic anomaly and the magnetic sensor 120 is being affected by a disturbance noise.

That is, in this case, the control section 170 judges that the output of the magnetic sensor 120 is not reliable (Step S126).

Note that the series of processing operations shown in FIG. 4 is hereinafter referred to as "reliability judgment processing" for convenience of explanation.

At Step S124, when judged that the comparison result is within the threshold range (NO at Step S104), the control section 170 temporarily stops the sensing operation of the angular velocity sensor 130 (Step S106).

Then, the control section 170 performs an operation of detecting angular velocity by using the magnetic gyro sensor constituted by the magnetic sensor 120 or by the acceleration sensor 110 and the magnetic sensor 120 (Step S108).

That is, when there is no magnetic field disturbance or magnetic anomaly and the output of the magnetic sensor 120 is reliable, the control section 170 selects the method of detecting angular velocity by the magnetic gyro sensor.

At Step S104, when judged that there is a magnetic field disturbance or magnetic anomaly (YES at Step S104), the control section 170 judges whether the angular velocity sensor 130 is operating (Step S110). Then, when judged that the angular velocity sensor 130 is operating (YES at Step S110), the control section 170 performs an operation of detecting angular velocity by the angular velocity sensor 130 (Step S114).

When judged that the angular velocity sensor 130 is not operating (NO at Step S110), the control section 170 activates the angular velocity sensor 130 (Step S112), and performs an operation of detecting angular velocity by the angular velocity sensor 130 (Step S114).

That is, when there is a magnetic field disturbance or magnetic anomaly and the output of the magnetic sensor 120 is not reliable, the control section 170 selects the method of detecting angular velocity by the angular velocity sensor 130.

Regarding the angular velocity detected by the magnetic gyro sensor at Step S108 or the angular velocity detected by the angular velocity sensor at Step S114, the control section 170 associates it with time data, and stores it in the predetermined storage area of the memory section 180 as angular velocity data (Step S116). Also, the control section 170 uses it when, for example, generating information regarding the user's exercise status, movement trajectory, etc.

This series of processing operations of the flowchart of FIG. 3 by the control section 170 is periodically repeated, for example, at predetermined time intervals.

Note that, although omitted in the flowchart of FIG. 3, the control section 170 constantly monitors for an input operation of stopping or ending the series of processing operations and change in the operation status while performing these processing operations, and forcibly ends this series of processing operations when the input operation or the status change is detected.

More specifically, the control section 170 detects a power off operation by the user, a decrease in the battery remaining amount of the power supply section 190, anomaly in a function or an application being executed, or the like, and forcibly stops and ends the series of processing operations.

In the angular velocity acquisition method according the present embodiment, for example, the following method can be applied as the method of detecting (calculating) angular velocity by the magnetic gyro sensor constituted by the magnetic sensor 120 or constituted including the acceleration sensor 110 and the magnetic sensor 120.

That is, first, the control section 170 calculates speed in three-dimensional space based on the temporal change amounts of the outputs of the acceleration sensor 110 and the magnetic sensor 120. Here, the strength and direction of geomagnetism in a specific position and area are basically constant and do not change. With acceptance on this point, for example, if a change in the direction of geomagnetism is detected when the magnetic sensor 120 is being operated at fixed time intervals, the control section 170 judges that the change in the direction of geomagnetism has occurred by the rotation of the magnetic sensor 120 (electronic apparatus 100), and detects the rotation status. As a result, angular velocities related to three axes defined by the magnetic sensor 120 can be calculated.

As the magnetic data usage method according to the present embodiment, for example, the following methods can be applied.

That is, geomagnetism in three axial directions which is detected by the magnetic sensor 120 in the present embodiment is used when angular velocity is calculated by the acceleration sensor 110 and the magnetic sensor 120 functioning as a magnetic gyro sensor as described above. In addition, it is used as the output of the magnetic sensor 120 itself when information regarding the user's exercise status, movement trajectory, etc. is generated.

Accordingly, in the present embodiment, a data usage method using a time-sharing technique can be adopted in which an operation (A) where geomagnetism data in three axial directions detected by the magnetic sensor 120 as shown in (a) of FIG. 5 is used by the magnetic gyro sensor and an operation (B) where the data is used with the magnetic sensor 120 being used as it is are alternately and repeatedly performed at predetermined time intervals, as shown in (b) of FIG. 5.

By the usage of a series of data detected by the magnetic sensor 120 being switched for every period as described above, the processing load on the control section 170 can be reduced.

Also, in the present embodiment, a data usage method using a parallel processing technique can be adopted in which the operation (A) where the geomagnetism data in three axial directions shown in (a) of FIG. 5 is used by the magnetic gyro sensor and the operation (B) where the data is used with the magnetic sensor 120 being used as it is are simultaneously performed in parallel, as shown in (c) of FIG. 5.

By data detected by the magnetic sensor 120 being shared in parallel by use as just described, no data gap occurs and reliable angular velocity, exercise information, and the like can be provided.

As described above, in the present embodiment, when a magnetic field around the magnetic sensor 120 is stable, the angular velocity sensor 130 enters a stop state and angular velocity is acquired by the magnetic gyro sensor using the outputs of the acceleration sensor 110 and the magnetic sensor 120.

As a result of this configuration, the acceleration sensor 110 and the magnetic sensor 120 whose power consumptions are small as compared to that of the angular velocity sensor 130 can be used. Accordingly, the power consumption of the electronic apparatus 100 is reduced, which contributes to the improvement of the driving time. In addition, a reliable and adequate angular velocity can be acquired.

More specifically, magnetic sensors and acceleration sensors generally operate with an electric current of the order of tens to hundreds of microamperes. By contrast, angular velocity sensors operate with an electric current of the order of milliamperes. Thus, by the angular velocity acquisition method according to the present embodiment being applied, the power consumption of the electronic apparatus 100 can be significantly reduced as compared to a method where angular velocity is acquired only by an angular velocity sensor.

In addition, when the magnetic sensor 120 is affected by disturbance noise and therefore its output is abnormal, the angular velocity sensor 130 which is not affected by the surrounding magnetic field can be used, so that a reliable and adequate angular velocity can be acquired.

(Modification Example)

Next, a modification example of the above-described embodiment is described.

In the angular velocity acquisition method according to the above-described embodiment, the method of judging whether or not there is any disturbance or magnetic anomaly in a magnetic field around the magnetic sensor 120 (Step S104) has been described, in which angular velocity detected (calculated) by the magnetic gyro sensor constituted by the magnetic sensor 120 or by the acceleration sensor 110 and the magnetic sensor 120 and angular velocity detected by the angular velocity sensor 130 are compared with each other. However, the present invention is not limited thereto and the following methods can be adopted.

(1) The control section 170 judges whether or not the total value of outputs in three axial directions from the magnetic sensor 120 or the value of an output in a specific axial direction is larger than a threshold value set in advance.

Then, the control section 170 judges that there is a disturbance or magnetic anomaly in a magnetic field around the magnetic sensor 120 when the output value is larger than the threshold value, or judges that there is no disturbance or magnetic anomaly in the magnetic field around the magnetic sensor 120 when the output value is not larger than the threshold value.

Here, in order to prevent the reduction of the judgment accuracy due to a sudden or momentary magnetic field disturbance or magnetic anomaly, the control section 170 should preferably judge that there is a magnetic field disturbance or magnetic anomaly when a state where the output value of the magnetic sensor 120 is larger than the threshold value continues for a predetermined time or is detected more than a predetermined number of times in a predetermined period.

(2) The control section 170 judges whether there is change in the output of the magnetic sensor 120 when there is no change in the output of the acceleration sensor 110 or when the value of a change in the output of the acceleration sensor 110 is equal to or less than a threshold value set in advance.

Then, when a change occurs in the output of the magnetic sensor 120 or when the value of a change in the output of the magnetic sensor 120 is equal to or larger than a threshold value set in advance, the control section 170 judges that there is a disturbance or magnetic anomaly in a magnetic field around the magnetic sensor 120.

That is, in a normal situation, when the electronic apparatus 100 is not being moved or used, no change occurs in the outputs of the acceleration sensor 110 and the magnetic sensor 120. Accordingly, if a change occurs in the output of the magnetic sensor 120 in this situation, a judgment can be made that the magnetic sensor 120 is being affected by a disturbance noise (magnetic field disturbance or magnetic anomaly).

(3) The control section 170 calculates the strength and direction of a magnetic field at the current location of the electronic apparatus 100 based on the output of the magnetic sensor 120, and judges whether the values of the strength and direction of the magnetic field (geomagnetism) at the current location are unusual values that are different from the values of the usual strength and direction of the magnetic field.

That is, in any area on the earth, the strength and direction of each magnetic field attributed to geomagnetism are basically definite and already known. Accordingly, when the values of the strength and direction of a magnetic field calculated based on the output of the magnetic sensor 120 is unusual values that are different from the values of the usual strength and direction of the magnetic field, the control section 170 judges that there is a disturbance or magnetic anomaly in the magnetic field around the magnetic sensor 120.

Here, information regarding the current location of the electronic apparatus 100 may be acquired by a positioning section using GPS or the like being added to the structure of the electronic apparatus 100 shown in FIG. 2. Also, a configuration may be adopted in which it is acquired by the user selecting an area or a region where the electronic apparatus 100 is currently located. Based on this information, the usual strength and direction of a magnetic field can be estimated.

<Second Embodiment>

Next, an angular velocity acquisition method for an electronic apparatus according to a second embodiment of the present invention is described with reference to the drawings. Note that, here, descriptions of part of the method that is equal to the first embodiment are simplified.

FIG. 6, FIG. 7A, FIG. 7B and FIG. 7C are flowcharts showing an example of the angular velocity acquisition method for the electronic apparatus according to the second embodiment.

In the first embodiment and its modification, the method has been described in which where or not there is any disturbance or magnetic anomaly in a magnetic field around the magnetic sensor 120 is judged, and a method for detecting angular velocity is selected based on a result of this judgment.

In the second embodiment, in addition to this judgment processing, processing is performed in which whether the output of the magnetic sensor 120 is reliable is judged, and calibration processing for the magnetic sensor 120 is performed based on a result of this judgment.

This angular velocity acquisition method (flowcharts in FIG. 6, FIG. 7A, FIG. 7B and FIG. 7C) for the electronic apparatus 100 is also achieved by the control section 170 performing processing according to a predetermined control program and a predetermined algorithm program, as in the first embodiment.

Here, the control section 170 corresponds to an offset judgment section and a calibration control section.

Figure 6:
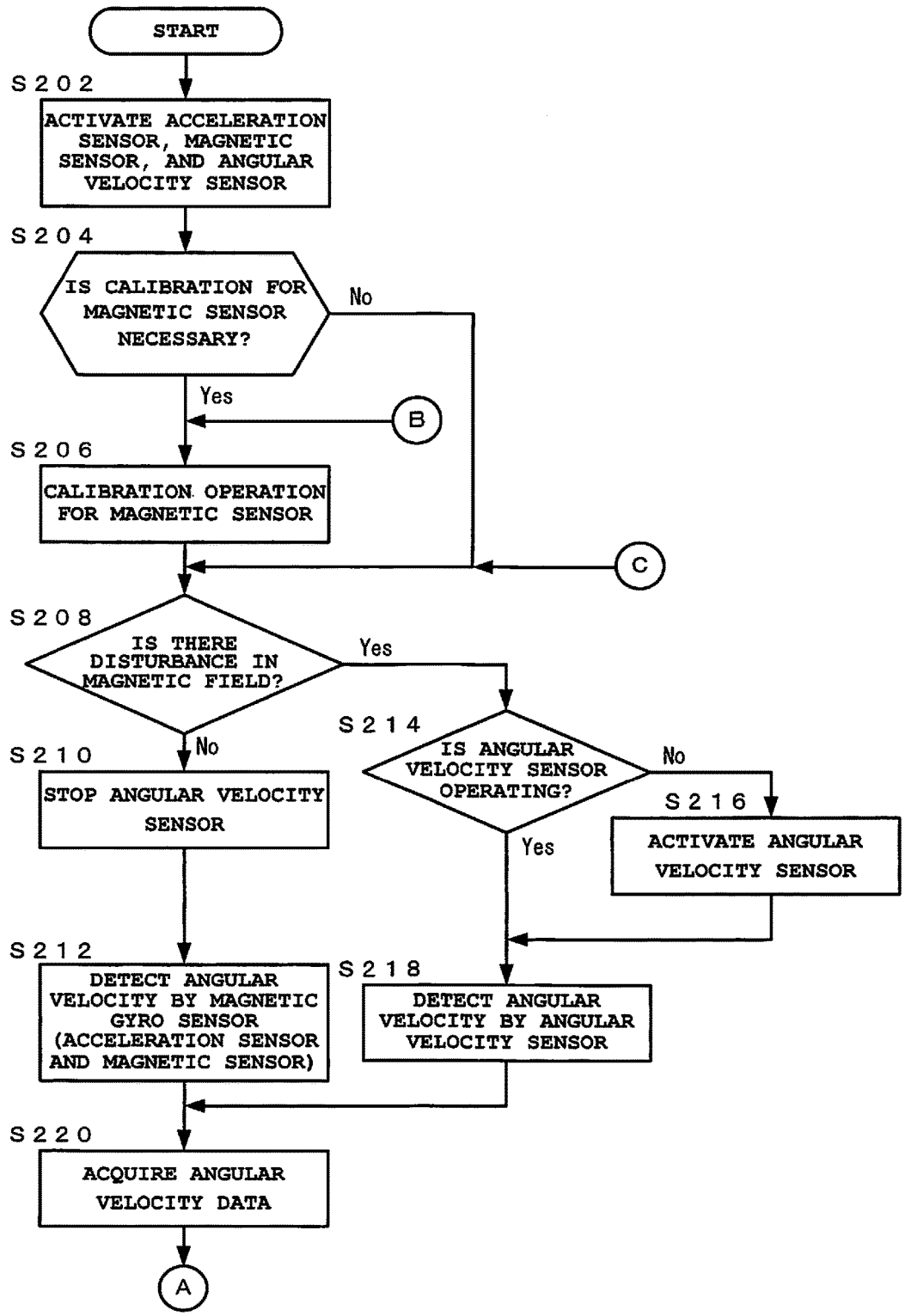
FIG. 6 is a first flowchart showing an example of an angular velocity acquisition method for an electronic apparatus according to a second embodiment.

In the angular velocity acquisition method according to the second embodiment, when the electronic apparatus 100 is turned on, the acceleration sensor 110, the magnetic sensor 120, and the angular velocity sensor 130 are activated (Step S202), and the control section 170 judges whether calibration processing for the magnetic sensor 120 is necessary (Step S204), as shown in the flowchart of FIG. 6.

Specifically, as in the case of the reliability judgment processing (Step S120 to Step S126) shown in the flowchart of FIG. 4 in the first embodiment, the control section 170 synchronizes the acceleration sensor 110 and the magnetic sensor 120 constituting a magnetic gyro sensor with the angular velocity sensor 130 so as to operate them, and detects angular velocity from each output therefrom (Step S120).

Subsequently, the control section 170 compares the individually detected angular velocities with each other (Step S122).

Then, when the comparison result (difference) is within a predetermined threshold range (Step S124), the control section 170 judges that calibration processing is not necessary because the offset value of the magnetic sensor 120 is a known value and its output is reliable (Step S126).

Conversely, when the comparison result is not within the predetermined threshold range (Step S124), the control section 170 judges that calibration processing is necessary because the offset value of the magnetic sensor 120 has been changed from the known value and its output is not reliable (Step S126).

When judged at Step S204 that calibration processing for the magnetic sensor 120 is necessary (YES at Step S204), the control section 170 performs predetermined calibration processing (Step S206).

Then, after performing the calibration processing, the control section 170 performs processing operations equivalent to those of Step S104 to Step S116 in the first embodiment (the flowchart in FIG. 3), and acquires angular velocity data detected by the magnetic gyro sensor or the angular velocity sensor 130.

Note that the calibration processing for the magnetic sensor 120 herein may be automatically performed by a well-known calibration method, or may be manually performed by the user being prompted to perform it.

That is, the control section 170 judges whether or not there is any disturbance or magnetic anomaly in a magnetic field around the magnetic sensor 120 at this point (Step S208).

Then, when judged that there is no magnetic field disturbance or magnetic anomaly (NO at Step S208), the control section 170 temporarily stops the sensing operation of the angular velocity sensor 130 (Step S210), and performs an operation of detecting angular velocity by the magnetic gyro sensor (Step S212).

Conversely, when judged that there is a magnetic field disturbance or magnetic anomaly (YES at Step S208), the control section 170 starts the angular velocity sensor 130 (Step S214 and Step S216) to perform an angular velocity detection operation thereby (Step S218).

Then, the control section 170 associates the detected angular velocity with time data, and stores it in the predetermined storage area of the memory section 180 as angular velocity data (Step S220).

Note that, in the processing of judging whether or not there is any disturbance or magnetic anomaly in the magnetic field around the magnetic sensor 120 at Step S208, processing operations may be performed which are the same as those of the reliability judgment processing shown in the flowchart of FIG. 4 in the first embodiment.

As another method for judging whether or not there is any disturbance or magnetic anomaly in the magnetic field around the magnetic sensor 120, a method may be adopted in which, in the processing of judging whether calibration processing for the magnetic sensor 120 is necessary at Step S204, whether or not there is a magnetic field disturbance or magnetic anomaly is judged based on whether the result of the comparison (difference) between the angular velocities is within the predetermined threshold range.

Figure 7A:
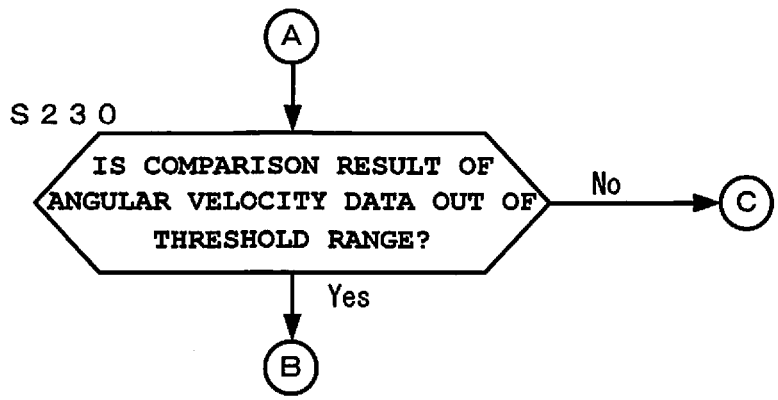
FIG. 7A, FIG. 7B and FIG. 7C are second flowcharts showing the example of the angular velocity acquisition method for the electronic apparatus according to the second embodiment.
Figure 7B:
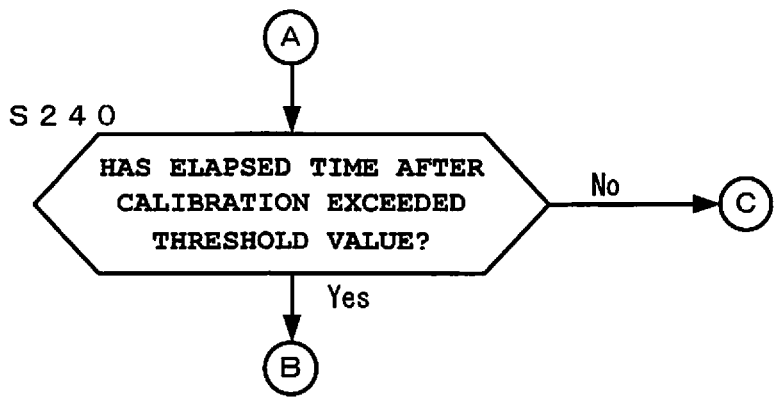
Figure 7C:
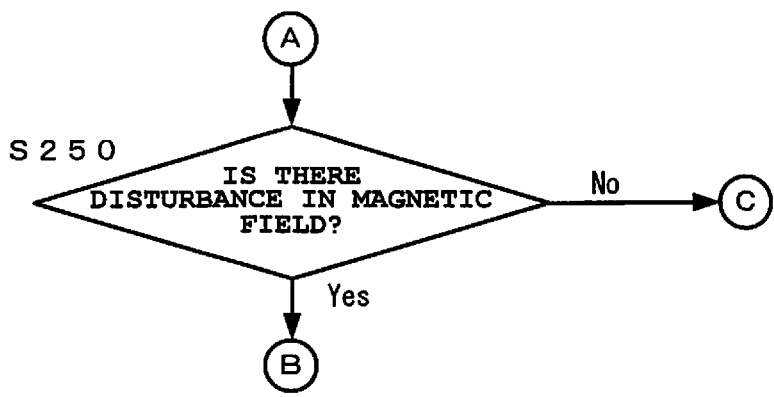

Next, the control section 170 judges whether calibration processing for the magnetic sensor 120 is necessary based on the reliability of the output of the magnetic sensor 120, as shown in the flowcharts of FIG. 7A, FIG. 7B and FIG. 7C (Step S230, Step S240, and Step S250).

Specifically, in judgment processing at Step S230, the control section 170 detects angular velocity by either the magnetic gyro sensor or the angular velocity sensor 130, acquires the data of the angular velocity (Step S220), and then performs processing operations that are the same as those of the above-described processing (at Step S204) for judging whether or not calibration processing for the magnetic sensor 120 is necessary.

That is, the control section 170 synchronizes the acceleration sensor 110 and the magnetic sensor 120 constituting the magnetic gyro sensor with the angular velocity sensor 130 so as to operate them, and judges whether a result of comparison (difference) between individually detected angular velocities is out of the predetermined threshold range.

When the comparison result is out of the predetermined threshold range (YES at Step S230), the control section 170 judges that calibration processing is necessary because the offset value of the magnetic sensor 120 has been changed from the known value and its output is not reliable.

In this case, the control section 170 returns to Step S206, performs calibration processing for the magnetic sensor 120, and then acquires angular velocity data by performing the processing operations at Step S208 and the following steps.

Conversely, when the comparison result is within the predetermined threshold range (NO at Step S230), the control section 170 judges that calibration processing is not necessary because the offset value of the magnetic sensor 120 is normal and its output is reliable.

In this case, the control section 170 acquires angular velocity data by performing the processing operations at Step S208 and the following steps without performing calibration processing for the magnetic sensor 120.

In judgment processing at Step S240, the control section 170 judges whether time elapsed from preceding calibration processing for the magnetic sensor 120 has exceeded a predetermined threshold value.

When judged that the elapsed time has exceeded the threshold value (YES at Step S240), the control section 170 judges that calibration processing is necessary because the offset value of the magnetic sensor 120 may not be normal (accurate) and therefore its output is not reliable. In this case, the control section 170 returns to Step S206, and performs calibration processing for the magnetic sensor 120.

Conversely, when judged that the elapsed time has not exceeded the threshold value (NO at Step S240), the control section 170 presumes that the offset value of the magnetic sensor 120 is a known value and its output is reliable, and therefore judges that calibration processing is not necessary. In this case, the control section 170 performs the processing operations at Step S208 and the following steps without performing calibration processing for the magnetic sensor 120.

In judgment processing at Step S250, the control section 170 refers to a history of outputs of the magnetic gyro sensor collected in the past, and thereby judges whether or not there is any disturbance or magnetic anomaly in the magnetic field around the magnetic sensor 120.

In this history of outputs of the magnetic gyro sensor, when the number of times a magnetic field disturbance or magnetic anomaly has been observed is larger than a predetermined threshold value (YES at Step S250), the control section 170 judges that calibration processing is necessary because the offset value of the magnetic sensor 120 may not be normal (accurate) and therefore its output is not reliable. In this case, the control section 170 returns to Step S206 and performs calibration processing for the magnetic sensor 120.

Conversely, when the number of times a magnetic field disturbance or magnetic anomaly has been observed is less than the predetermined threshold value (NO at Step S250), the control section 170 judges that calibration processing is not necessary because the offset value of the magnetic sensor 120 is a known value and therefore its output is reliable. In this case, the control section 170 performs the processing operations at Step S208 and the following steps without performing calibration processing for the magnetic sensor 120.

As described above, in this embodiment, in addition to the processing operations of the angular velocity acquisition method of the first embodiment, the control of the execution of calibration processing for correcting the offset value of the magnetic sensor 120 is performed based on whether the output of the magnetic sensor 120 is reliable.

As a result of this configuration, the offset value of the magnetic sensor 120 constituting the magnetic gyro sensor can be constantly corrected to an accurate value, whereby the power consumption of the electronic apparatus 100 can be reduced and a more reliable and adequate angular velocity can be acquired.

(Modification Example)

Next, a modification example of the above-described embodiment is described.

In the above-described embodiment, the processing for judging whether calibration processing for the magnetic sensor 120 is necessary is performed at Step S204 after the activation of each sensor. However, the present invention is not limited thereto. Specifically, a configuration may be adopted in which, after the activation of each sensor, the calibration processing for the magnetic sensor 120 at Step S206 is automatically performed without the judgment processing at Step S204. As a result of this configuration, the necessity judgment processing regarding calibration processing for the magnetic sensor 120 can be included in one of the processing operations at Step S230, Step S240 and Step S250, whereby a processing load immediately after the activation of the electronic apparatus 100 can be reduced.

Also, in the method of the present embodiment, when angular velocities individually detected by the magnetic gyro sensor and the angular velocity sensor are compared with each other based on the premise that the output of the angular velocity sensor is accurate, and the output of the magnetic gyro sensor is different from (different with reference to) that of the angular velocity sensor 130 by more than a threshold value, the offset value of the magnetic sensor 120 is judged to have been changed from a known value, and calibration processing is performed. However, the present invention is not limited thereto.

That is, a configuration may be adopted in which, when angular velocities individually detected by the magnetic gyro sensor and the angular velocity sensor are compared with each other based on the premise that the output of the magnetic gyro sensor is accurate, and the output of the angular velocity sensor 130 is different from (different with reference to) that of the magnetic gyro sensor by a value significantly larger than a threshold value, the offset value of the angular velocity sensor 130 is judged to have been changed from a known value, and calibration processing for the angular velocity sensor 130 is performed. Here, the output of the magnetic sensor 120 constituting the magnetic gyro sensor can be maintained at an accurate value by calibration processing being performed immediately after the activation of the acceleration sensor 110, the magnetic sensor 120, and the angular velocity sensor 130, as shown at Step S206.

Moreover, in the present invention, a configuration may be adopted in which the method of judging whether calibration processing for the magnetic sensor 120 is necessary in the above-described embodiment and the above-described method of judging whether calibration processing for the angular velocity sensor 130 is necessary by judging whether the offset value of the angular velocity sensor 130 has been changed from a known value are both performed, whereby the offset value of the magnetic sensor 120 and the offset value of the angular velocity sensor 130 are maintained at known values.

By this configuration, the output of the angular velocity sensor 130 or the outputs of the magnetic gyro sensor and the angular velocity sensor 130 can be maintained at accurate values, whereby a reliable and adequate angular velocity can be acquired.

Furthermore, in the above-described embodiments and their modification examples, the method using the magnetic gyro sensor has been described in which angular velocity is detected (calculated) using the outputs of the acceleration sensor 110 and the magnetic sensor 120. However, the present invention is not limited thereto and a method may be adopted in which angular velocity is detected (calculated) based only on the output of the magnetic sensor 120).

While the present invention has been described with reference to the preferred embodiments, it is intended that the invention be not limited by any of the details of the description therein but includes all the embodiments which fall within the scope of the appended claims.

What is claimed is:

1. An electronic apparatus comprising:
   a magnetic gyro sensor comprising a magnetic sensor;
   an angular velocity sensor, wherein power consumption by the angular velocity sensor is larger than power consumption by the magnetic gyro sensor; and
   a processor configured to:
   control the magnetic sensor to detect a magnetic field around the electronic apparatus;
   judge whether there is disturbance in the magnetic field around the electronic apparatus based on the magnetic field detected by the magnetic sensor;
   in response to judging that there is no disturbance in the magnetic field around the electronic apparatus, control the magnetic gyro sensor to detect an angular velocity of a spatial movement of the electronic apparatus; and
   in response to judging that there is disturbance in the magnetic field around the electronic apparatus, control the angular velocity sensor to detect the angular velocity of the spatial movement of the electronic apparatus.

2. The electronic apparatus according to claim 1, wherein the processor is configured to:
   determine whether a difference between a first angular velocity detected in a first period by the angular velocity sensor with a second angular velocity detected in the first period by the magnetic gyro sensor, based on the magnetic field detected by the magnetic sensor, is within a threshold range;
   in response to determining that the difference is within the threshold, judge that there is no disturbance in the magnetic field around the electronic apparatus;
   in response to judging that there is no disturbance in the magnetic field around the electronic apparatus:
   stop operation of the angular velocity sensor; and
   control the magnetic gyro sensor to detect the angular velocity of the spatial movement of the electronic apparatus after stopping operation of the angular velocity sensor; and
   in response to determining that the difference is not within the threshold, judge that there is disturbance in the magnetic field around the electronic apparatus.

3. The electronic apparatus according to claim 1, wherein the processor is configured to:
   determine whether the magnetic field detected by the magnetic sensor exceeds a threshold value;
   in response to determining that the magnetic field detected by the magnetic sensor does not exceed the threshold value, judge that there is no disturbance in the magnetic field around the electronic apparatus; and
   in response to determining that the magnetic field detected by the magnetic sensor does exceed the threshold value, judge that there is disturbance in the magnetic field around the electronic apparatus.

4. The electronic apparatus according to claim 1,
wherein the magnetic gyro sensor further comprises an acceleration sensor, and
wherein the processor is configured to:
control the acceleration sensor to detect an acceleration of the electronic apparatus;
determine whether a change occurs in the magnetic field detected by the magnetic sensor and whether a change occurs in the acceleration detected by the acceleration sensor;
in response to determining that a change occurs in the magnetic field detected by the magnetic sensor and a change does not occur in the acceleration detected by the acceleration sensor, judge that there is disturbance in the magnetic field around the electronic apparatus; and
in response to determining that a change does not occur in the magnetic field detected by the magnetic sensor and a change does not occur in the acceleration detected by the acceleration sensor, judge that there is no disturbance in the magnetic field around the electronic apparatus.

5. The electronic apparatus according to claim 1,
wherein the processor is configured to:
determine whether a strength, a direction or both of the magnetic field detected by the magnetic sensor is different from known values of a strength and direction of a magnetic field attributed to geomagnetism at a geographical location of the electronic apparatus;
in response to determining that the strength, the direction or both of the magnetic field detected by the magnetic sensor is different from the known values of the strength and direction of the magnetic field attributed to geomagnetism at the geographical location of the electronic apparatus, judge that there is disturbance in the magnetic field around the electronic apparatus; and
in response to determining that the strength, the direction or both of the magnetic field detected by the magnetic sensor is not different from the known values of the strength and direction of the magnetic field attributed to geomagnetism at the geographical location of the electronic apparatus, judge that there is no disturbance in the magnetic field around the electronic apparatus.

6. The electronic apparatus according to claim 1,
wherein the processor is configured to:
judge whether there is an anomaly in an offset value of the magnetic sensor or the angular velocity sensor; and
control to execute calibration processing for correcting the offset value of the magnetic sensor or the angular velocity sensor, based on a result of judgment of whether there is the anomaly in the offset value.

7. The electronic apparatus according to claim 6,
wherein the processor is configured to:
determine whether a difference between a first angular velocity detected in a first period by the angular velocity sensor and a second angular velocity detected in the first period by the magnetic gyro sensor is out of a threshold range; and
in response to determining that the difference is out of the threshold range, judge that there is an anomaly in the offset value of the magnetic sensor or the angular velocity sensors, and and control to execute calibration processing for correcting the offset value of the magnetic sensor or the angular velocity sensor.

8. The electronic apparatus according to claim 6,
wherein the processor is configured to:
determine whether time elapsed from preceding calibration processing for the magnetic sensor or the angular velocity sensor exceeds a threshold value; and
in response to determining that the time elapsed exceeds the threshold value, control to execute calibration processing for the magnetic sensor or the angular velocity sensor.

9. The electronic apparatus according to claim 6,
wherein the processor is configured to:
determine, by reference to a history of angular velocities detected in a predetermined period by the magnetic gyro sensor or the angular velocity sensor, whether number of times a disturbance in the magnetic field around the electronic apparatus is detected is larger than a threshold value; and
in response to determining that the number of times a disturbance in the magnetic field around the electronic apparatus is detected is larger than the threshold value, judge that there is an anomaly in the offset value of the magnetic sensor or the angular velocity sensor, and control to perform calibration processing for the magnetic sensor or the angular velocity sensor.

10. A method for controlling an electronic apparatus comprising:
a magnetic gyro sensor comprising a magnetic sensor; and
an angular velocity sensor, wherein power consumption by the angular velocity sensor is larger than power consumption by the magnetic gyro sensor,
wherein the method comprises:
controlling the magnetic sensor to detect a magnetic field around the electronic apparatus;
determining whether there is disturbance in the magnetic field around the electronic apparatus based on the magnetic field detected by the magnetic sensor;
in response to determining that there is no disturbance in the magnetic field around the electronic apparatus, controlling the magnetic gyro sensor to detect an angular velocity of a spatial movement of the electronic apparatus; and
in response to determining that there is disturbance in the magnetic field around the electronic apparatus, controlling the angular velocity sensor to detect the angular velocity of the spatial movement of the electronic apparatus.

11. The method according to claim 10, comprising:
determining whether a difference between a first angular velocity detected in a first period by the angular velocity sensor with a second angular velocity detected in the first period by the magnetic gyro sensor, based on the magnetic field detected by the magnetic sensor, is within a threshold range;
in response to determining that the difference is within the threshold, judging that there is no disturbance in the magnetic field around the electronic apparatus;
in response to judging that there is no disturbance in the magnetic field around the electronic apparatus:
stopping operation of the angular velocity sensor; and
controlling the magnetic gyro sensor to detect the angular velocity of the spatial movement of the electronic apparatus after stopping operation of the angular velocity sensor; and in response to determining that the difference is not within the threshold, judging that there is disturbance in the magnetic field around the electronic apparatus.

12. The method according to claim 10, comprising:

determining whether the magnetic field detected by the magnetic sensor exceeds a threshold value;

in response to determining that the magnetic field detected by the magnetic sensor does not exceed the threshold value, judging that there is no disturbance in the magnetic field around the electronic apparatus; and in response to determining that the magnetic field detected by the magnetic sensor does not exceed the threshold value, judging that there is disturbance in the magnetic field around the electronic apparatus.

13. The method according to claim 10, wherein the magnetic gyro sensor further comprises an acceleration sensor, and wherein the method comprises:

controlling the acceleration sensor to detect an acceleration of the electronic apparatus;

determining whether a change occurs in the magnetic field detected by the magnetic sensor and whether a change occurs in the acceleration detected by the acceleration sensor;

in response to determining that a change occurs in the magnetic field detected by the magnetic sensor and a change does not occur in the acceleration detected by the acceleration sensor, judging that there is disturbance in the magnetic field around the electronic apparatus; and in response to determining that a change does not occur in the magnetic field detected by the magnetic sensor and a change does not occur in the acceleration detected by the acceleration sensor, judging that there is no disturbance in the magnetic field around the electronic apparatus.

14. The method according to claim 10, comprising:

determining whether a strength, a direction or both of the magnetic field detected by the magnetic sensor is different from known values of a strength and direction of a magnetic field attributed to geomagnetism at a geographical location of the electronic apparatus;

in response to determining that the strength, the direction or both of the magnetic field detected by the magnetic sensor is different from the known values of the strength and direction of the magnetic field attributed to geomagnetism at the geographical location of the electronic apparatus, judging that there is disturbance in the magnetic field around the electronic apparatus; and in response to determining that the strength, the direction or both of the magnetic field detected by the magnetic sensor is not different from the known values of the strength and direction of the magnetic field attributed to geomagnetism at the geographical location of the electronic apparatus, judging that there is no disturbance in the magnetic field around the electronic apparatus.

15. A non-transitory computer-readable storage medium having stored thereon a program that is executable by a computer of an electronic apparatus, wherein the electronic apparatus comprises:

a magnetic gyro sensor comprising a magnetic sensor; and an angular velocity sensor, wherein power consumption by the angular velocity sensor is larger than power consumption by the magnetic gyro sensor;

wherein the program is executable by the computer to at least perform:

controlling the magnetic sensor to detect a magnetic field around the electronic apparatus;

determining whether there is disturbance in the magnetic field around the electronic apparatus based on the magnetic field detected by the magnetic sensor;

in response to determining that there is no disturbance in the magnetic field around the electronic apparatus, controlling the magnetic gyro sensor to detect an angular velocity of a spatial movement of the electronic apparatus; and in response to determining that there is disturbance in the magnetic field around the electronic apparatus, controlling the angular velocity sensor to detect the angular velocity of the spatial movement of the electronic apparatus.

* * * * *

UNITED STATES PATENT AND TRADEMARK OFFICE
CERTIFICATE OF CORRECTION

PATENT NO. : 10,365,106 B2
APPLICATION NO. : 15/377355
DATED : July 30, 2019
INVENTOR(S) : Takanori Ishihama It is certified that error appears in the above-identified patent and that said Letters Patent is hereby corrected as shown below:

In the Claims

Column 15, Claim 7, Line 67 should read:
velocity sensors, and control to execute calibera- Signed and Sealed this
Third Day of December, 2019

Andrei Iancu
*Director of the United States Patent and Trademark Office*